Feb. 19, 1929.
K. IMHOFF
1,703,041
MEANS FOR UNOILING SEWAGE OR SLUDGE
Filed June 18, 1927
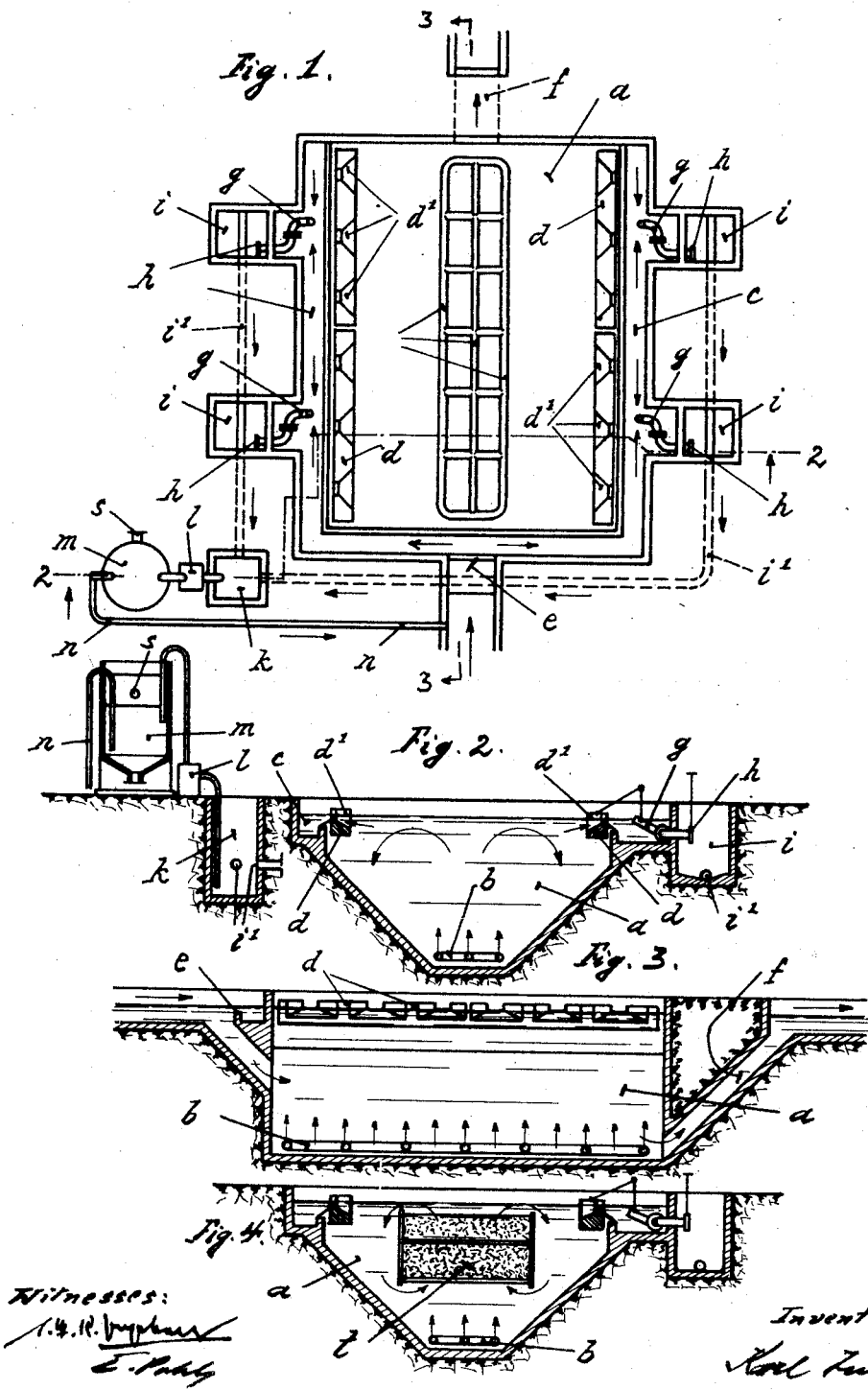

Patented Feb. 19, 1929.

1,703,041

UNITED STATES PATENT OFFICE.

KARL IMHOFF, OF ESSEN, GERMANY.

MEANS FOR UNOILING SEWAGE OR SLUDGE.

Application filed June 18, 1927, Serial No. 199,783, and in Germany December 2, 1926.

Of all ingredients of the domestic or industrial sewage, mineral oil is particularly troublesome. A great portion of the oil sticks to the suspended matter in the sewage and is difficult to be separated therefrom.

The present invention provides improved means by which the sewage or sludge can be unoiled within a passage tank, by agitating it therein, for instance by means of compressed-air supplied from the bottom of the tank, the oil particles being thereby washed out and driven up to the top level of the sewage where they can be removed.

The improved treatment can also advantageously be applied to sludge pumped, for instance, into the open sea, unoiled sludge being much more easily disposed of by the sea water and the disagreeable sight of floating oil on the surface of the sea being thus prevented.

The accompanying drawing illustrates diagrammatially by way of example how the invention can be put into practice: Fig. 1 is a plan view of an improved sewage unoiling plant according to the invention; Figs. 2 and 3 are vertical sections therethrough, respectively on the lines 2—2 and 3—3 of Fig. 1; and Fig. 4 is a vertical section, similar to that shown in Fig. 1, and comprising a submerged contact aerator.

The improved unoiling plant comprises an elongated tank $a$ through which the sewage is passed. To said tank compressed-air is supplied from the bottom thereof through perforated pipes $b$, whereby the sewage with its suspended matter is thoroughly agitated and sludge is prevented settling on the bottom of the tank while the oil sticking to the suspended substances is washed out and separated therefrom and driven up to the top level of the sewage in the tank. On both sides of the tank oil gutters $c$ are provided and separated from the interior of the tank by means of floating members such as beams $d$, so that the agitation produced by the compressed-air is not imparted to the contents in the oil gutters. As shown in Fig. 3 the oil gutters extend across one end of the tank where the sewage comes in and the bulk of the sewage is delivered underneath the gutter at this end. One side of the oil gutter at this end is shown made somewhat lower at $e$ in line with the incoming sewage and the oil on top of the sewage flows directly into this gutter; the opposite side thereof being higher so that the oil can not pass completely over the gutter into the tank. The gutters $c$ on the sides of the tank of course have their sides adjacent the beams $b$ low enough to permit the oil to flow into them as indicated in Figs. 2 and 4. Besides, the oil driven up by the compressed-air agitation in the tank $a$ flows through overflow apertures $d^1$ in the floating beams $d$ into the oil gutters $c$. In the latter, thus, a mixture of oil and sewage is collected, which must be continuously let off to make room for further incoming oil. For this purpose, pipes $g$ are provided of which the admission orifices are kept by means of a float at such a height that they permit an escape of the upper oil layer at any level of the contents in said oil gutters $c$. The outlet orifices of said pipes lead into channels $i$ and are controllable by flaps $h$ or the like. The channels $i$ are connected by a pipe system $i^1$ to a collector $k$ whence oil and sewage mixture is supplied through a pump $l$ to a separator $m$. From the latter, the heavy oil can be let off at the bottom and the light oil at the upper part thereof through a slide $s$, while the water separated from the oil flows continuously through the siphon pipe $n$ again to the inlet of the tank.

The oulet channel $f$ of the tank $a$ issues from the bottom theerof and is so narrow that the velocity of the escaping sewage always suffices to remove any settling sludge together with the sewage.

As shown in Fig. 4, the washing and oil separating action of the compressed-air can be further increased by arranging above the air supply pipes $b$ a submerged contact aerator $t$, for instance of brushwood or coke, for the purpose of attaining a more uniform distribution of the air and creating baffles aiding in the separation of the oil from the sewage or sludge.

What I claim is:—

1. A sewage unoiling plant comprising a tank through which the sewage flows, means for supplying compressed air at the bottom of said tank, lateral oil gutters in said tank, and floating beams separating said oil gutters from the interior of the tank and having overflow apertures therein communicating with the sewage level in the tank.

2. In a sewage unoiling plant as specified in claim 1, floating outlet pipes in said oil gutters having admission orifices communicating always with the level of the contents in said oil gutters and controllable outlet orifices.

3. In a sewage unoiling plant as specified in claim 1, a gutter or channel communicating with the lateral oil gutters and arranged to receive oil directly from the sewage flowing into the tank.

4. In a sewage unoiling plant as specified in claim 1, a submerged contact aerator in the tank above said compressed-air supply therein.

5. A sewage unoiling plant comprising a tank through which the sewage flows, means for supplying compressed air at the bottom of the tank, one or more oil gutters associated with the tank adjacent the normal level of the contents thereof to receive oil from said contents, and a floating member associated with each of said gutters to control the delivery of the oil thereto.

6. A sewage unoiling plant comprising a tank through which the sewage flows, means for supplying compressed air at the bottom of the tank, one or more oil gutters associated with the tank and arranged adjacent the normal level of the contents to receive oil from the contents of the tank, a floating member associated with each of said gutters to control the delivery of oil from the contents of the tank thereto, and one or more movable outlet pipes for each gutter connected with the member adjacent thereto.

7. A sewage unoiling plant comprising a tank through which the sewage flows and having an inlet leading thereto and an oil gutter associated with the tank and extending across said inlet to catch oil adjacent the surface of the sewage entering the tank, the tank having one or more additional oil gutters uniting with the first-named oil gutter, and means for supplying compressed air to the bottom of the tank.

In testimony whereof I have hereunto set my hand.

KARL IMHOFF.